Dec. 28, 1926.
E. C. TAYLOR
1,612,325
TIRE BUILDING
Filed March 26, 1923
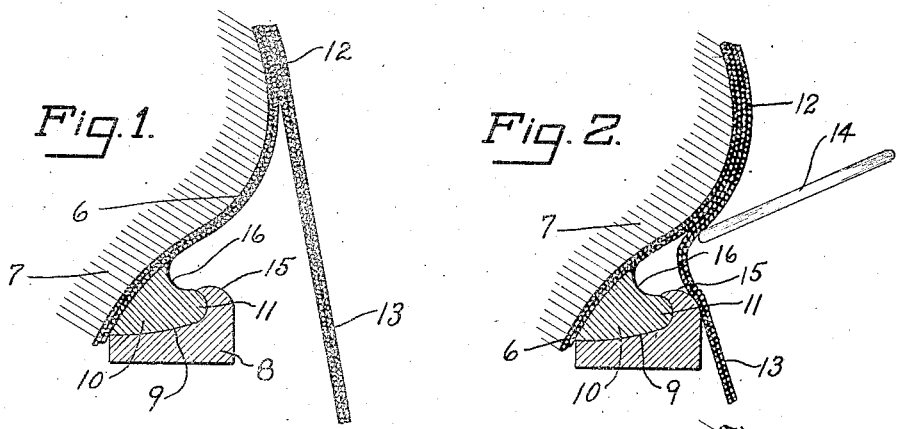
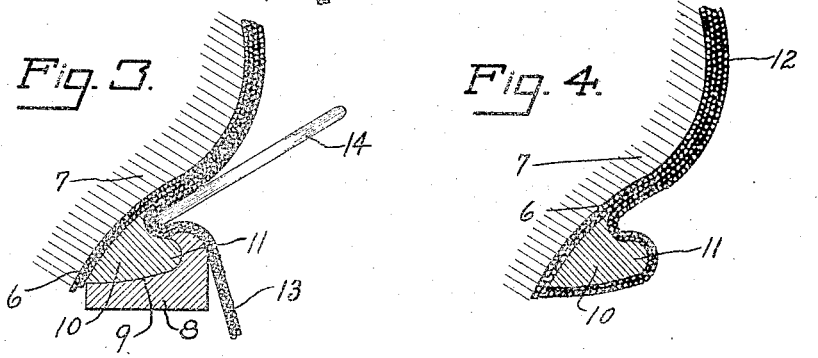
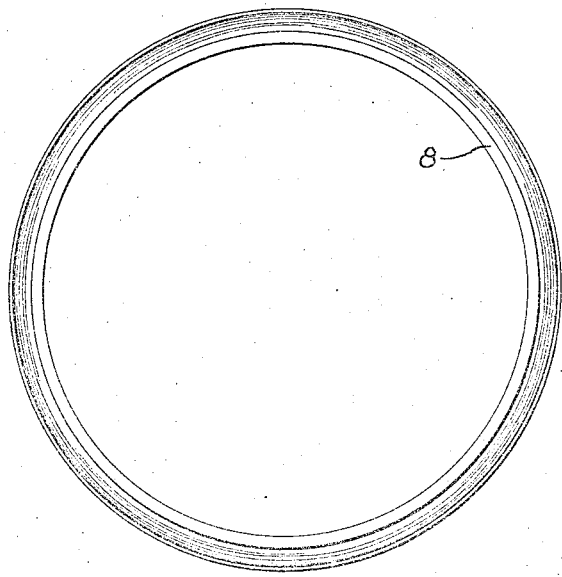
Fig. 5.
INVENTOR
Edward C. Taylor Patented Dec. 28, 1926.

1,612,325

UNITED STATES PATENT OFFICE.

EDWARD C. TAYLOR, OF LONGMEADOW, MASSACHUSETTS, ASSIGNOR TO THE FISK RUBBER COMPANY, OF CHICOPEE FALLS, MASSACHUSETTS, A CORPORATION OF MASSACHUSETTS.

TIRE BUILDING.

Application filed March 26, 1923. Serial No. 627,671.

My invention relates to the building of pneumatic tires, and more particularly to the making of the clincher type of pneumatic tires.

One object of my invention is to improve the laying of the outer plies of fabric into the clinch of the clincher bead. A further object is to avoid over-stretching during the process of molding and vulcanization of the tire, which results in consequent rim cutting when the tire is placed in use.

It has other and further objects which will appear from the following description and claims.

The invention will now be described with reference to the accompanying drawings, in which Fig. 1 is a fragmentary sectional view showing the outer plies of fabric in relation to the core, bead filler, and bead applying ring, before any substantial shaping of the outer plies has taken place;

Fig. 2 is a similar view, showing the outer plies of fabric partially stitched or shaped into their final position;

Fig. 3 is a similar view showing the laying of the outer plies of fabric into the clinch of the clincher bead;

Fig. 4 is a similar view showing the outer plies of fabric laid in place around the lower portion of the bead; and Fig. 5 is side elevation of the bead applying ring.

In making clincher tires it has been proposed to first build on the tire building support the inner plies of the fabric, position the bead filler by means of a centering ring, remove said ring, and shape the outer plies of the fabric over the inner plies and the bead filler. When, in this old method, plies of the fabric are being laid over the inner plies, the skirts of the outer plies of fabric come in contact with the heel of the bead filler and, being coated with uncured rubber, adhere to one another very readily. Thus the rubberized outer plies of fabric are prevented from being laid in the clinch of the clincher bead because of their adherence to the inner plies where they come into contact at the heel of the bead. It is not until the molding of the tire that the outer plies of the fabric are forced into the clinch of the clincher bead and held in place by the mold during the process of vulcanization. The forcing of a zone of the outer plies of fabric into the clinch of the clincher bead filler while the remainder of these plies are held by adhesive contact with the inner plies, tends to stretch the fabric locally beyond a safe limit. This over-stretching of the outer plies of the fabric destroys its strength and results in a tendency to rim cutting when the tire is in use.

By holding the skirts of the outer plies of the fabric away from the heel of the bead during the earlier stages of shaping, the outer or over-bead plies, I find I can lay the outer plies of the fabric well into the clinch of the clincher bead and thus prevent undue stretching during molding and vulcanization.

An annular ring is preferably used in holding the fabric away from the heel of the bead. The ring is constructed so as to cover the heel of the bead and give a means for supporting the bead when it is positioned on the tire. The ring has a curved surface over which the fabric slides freely in the several building operations. The ring is preferably made of metal, although wood or fibre may be substituted if desired.

In accordance with my improved process, the inner plies of the fabric 6 are positioned on the building support 7. A bead locating ring 8, having an annular seat 9 thereon for receiving and positioning the clincher bead 10, is so constructed as to cover the heel 11 of the bead filler 10. The bead ring 8 when positioned (as shown in Fig. 1) is left in place while the outer plies of the fabric 12 are laid on the inner plies 6 and into the clinch 16 of the bead filler 10 (Figs. 1 and 2). The separating of the outer plies of fabric by means of the ring 8 from the heel of the bead 11 does not permit any chance of the two adhering to one another before the fabric is laid into the clinch 16 of the clincher bead 10.

The outer plies 12 (Figs. 2 and 3) are held away from the heel 11 of the clincher bead 10 by the curved portion 15 of the bead ring 8. This curved portion 15 permits the skirts 13 of the outer plies to slide freely over it when the skirts are being laid or stitched into the clinch 16 of the clincher bead 10 by means of the tool 14. Now that the outer plies are laid well into the clinch 16, the ring 8 is removed, leaving the bead in position, this being accomplished due to the smooth surface of the curved portion 15, without any tendency of the ring to pull the fabric away from the bead, the curved surface 15 permitting the fabric to slide freely over it although the rubberized fabric is sticky. The curved surface 15 may be polished if desired to give a very smooth surface. After removing the ring the skirts 13 are then laid around the rest of the bead 10 as shown in Fig. 4.

The advantage derived from the laying of the outer plies of the fabric into the clinch of the clincher bead is that it prevents the bridging of the fabric at the clinch of the bead in the building operation, which occurred in the old method of building tires. In a tire built by my method the fabric is under a uniform tension because of the elimination of the unequal stretching of the fabric at the bead, thereby producing a more durable tire.

Having thus described my invention, I claim:

1. In the building of pneumatic tire casings of the clincher type from layers of fabric on a tire building support, the process which comprises as steps holding the outer plies of the fabric away from the heel of the bead, shaping the outer plies into the clinch of the clincher bead while they are so held, and subsequently shaping the fabric around the remainder of the bead.

2. In the building of pneumatic tire casings of the clincher type from layers of fabric on a tire building support, the process which comprises as steps laying upon the support the under-bead plies, applying a pair of bead fillers against said plies, applying the over-bead plies into the clinch of the bead filler while holding the sides of these plies out of contact with the heels of the bead fillers, and shaping the edges of the over-bead plies around the bead fillers.

3. In the building of pneumatic tire casings of the clincher type from layers of fabric on a tire building support, the process which comprises as steps forcing the outer plies of the fabric into the clinch of the clincher bead while preventing frictional contact with the heel of the bead, and subsequently shaping the fabric around the remainder of the bead.

EDWARD C. TAYLOR.